Feb. 11, 1930.  F. FISHBOURNE  1,747,109
DRYING RACK FOR FIRE HOSE
Filed March 3, 1927  2 Sheets-Sheet 2
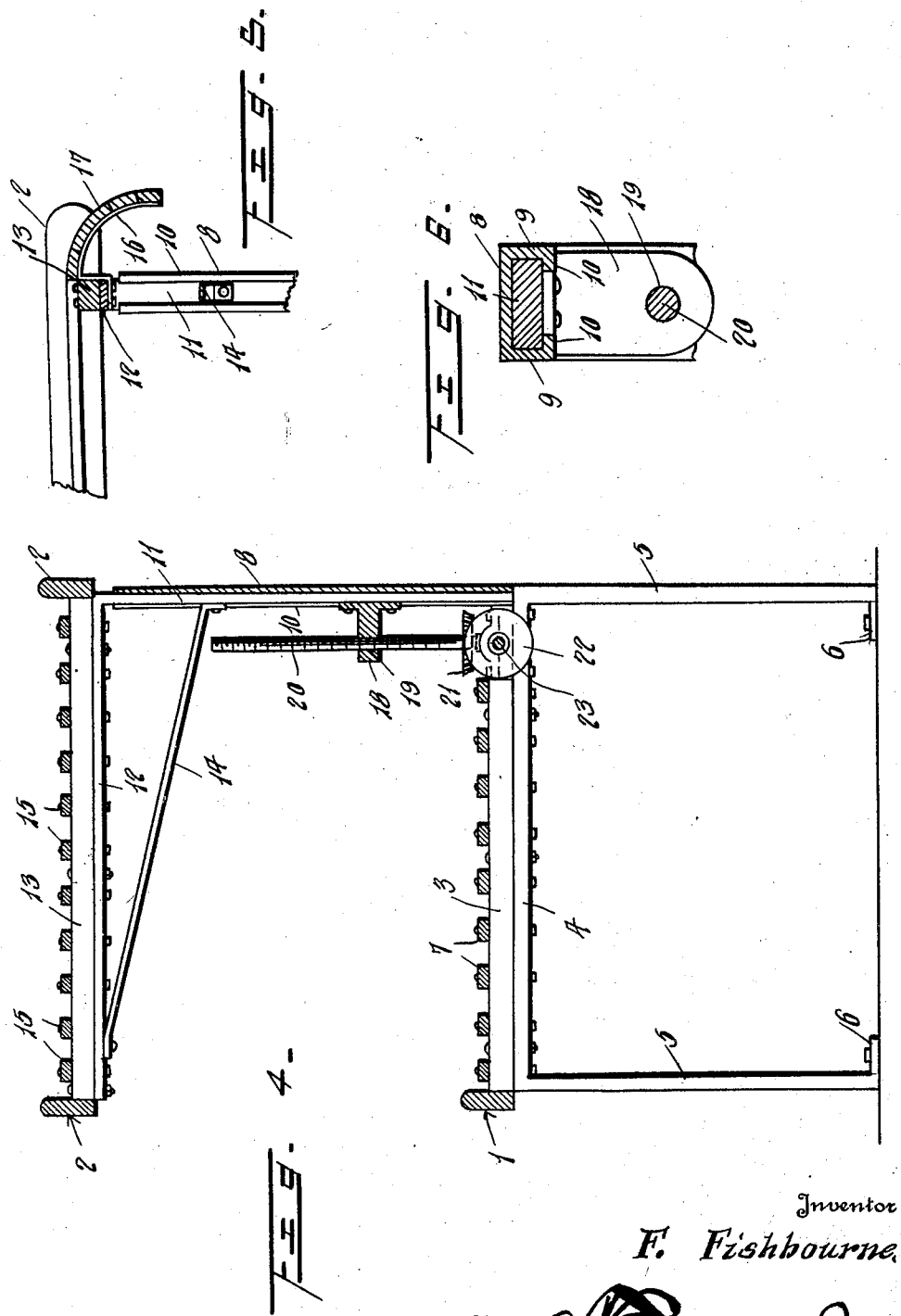

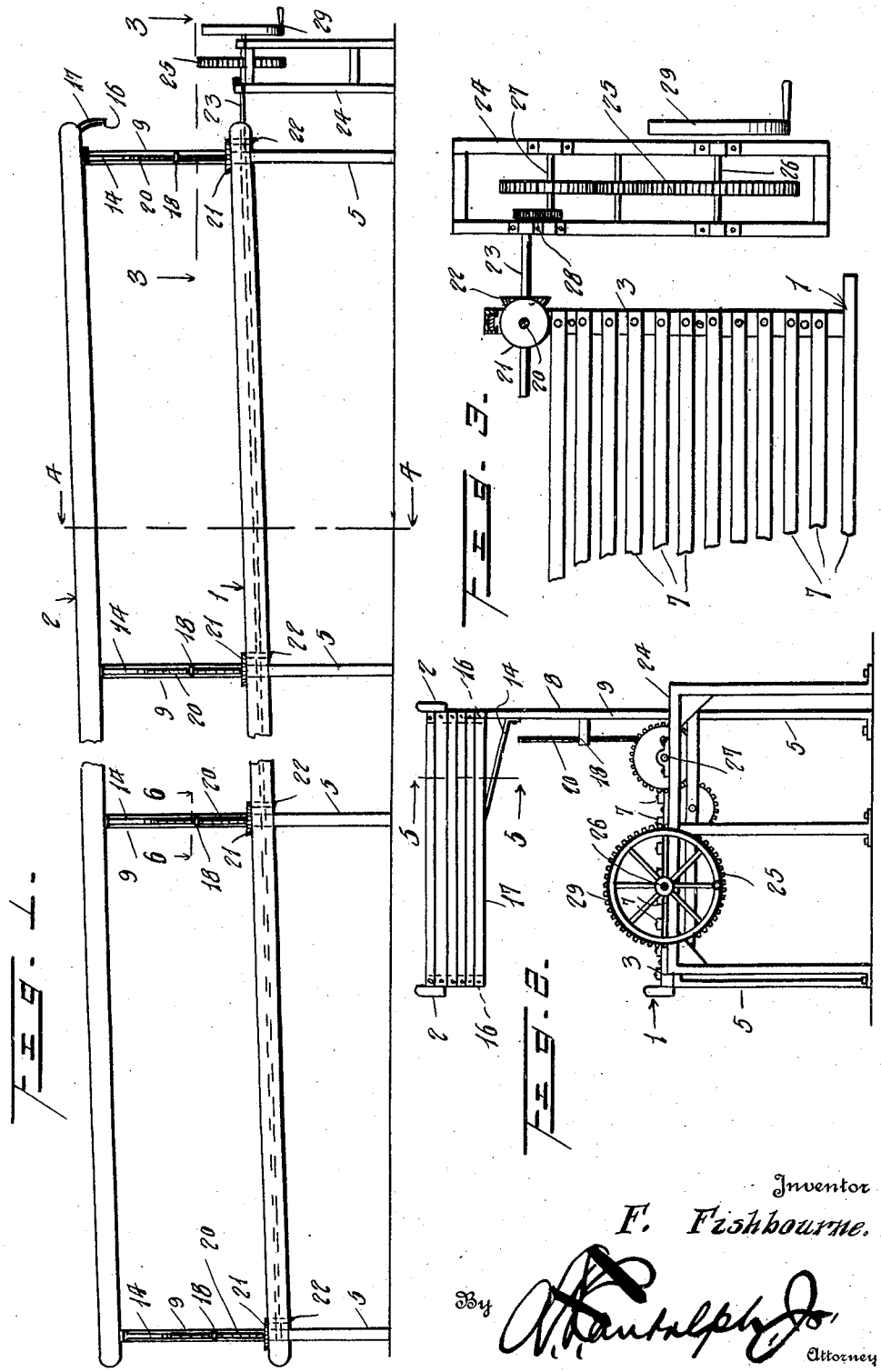

Patented Feb. 11, 1930

1,747,109

UNITED STATES PATENT OFFICE

FRANK FISHBOURNE, OF WHARTON, NEW JERSEY

DRYING RACK FOR FIRE HOSE

Application filed March 3, 1927. Serial No. 172,372.

The invention relates to a means for drying fire hose and the like and has for its object the provision of a rack for fire hose comprising inclined racks or shelves on which the fire hose may be stretched, one shelf being in a fixed position, while the other shelf or rack is arranged to be elevated and lowered for convenience in placing the hose thereon and elevating it while drying.

Another object of the invention is the provision of a drying rack for fire hose having two racks, one of which is mounted to be elevated and lowered relatively to the other rack and supported by a plurality of slidable bars, and means connected with said bars, and actuated by an operating shaft to elevate and lower the bars simultaneously.

The invention will be described in detail hereinafter and will be found illustrated in the accompanying drawings in which Figure 1 is a side view in elevation of a drying rack made in accordance with the invention, Figure 2 is an end view, Figure 3 is a horizontal sectional view of one end of the device on a plane indicated by the line 3—3 of Figure 1, Figure 4 is a transverse vertical section on a plane indicated by the line 4—4 of Figure 1, Figure 5 is a sectional detail on a plane indicated by the line 5—5 of Figure 2, and Figure 6 is a sectional detail on a plane indicated by the line 6—6 of Figure 1.

In the drawings similar reference characters will be used to designate corresponding parts throughout the several views.

The improved drying rack for fire hose comprises two rack members designated respectively 1 and 2. Rack 1 comprises cross pieces 3 that are supported by stands including horizontal members 4 arranged on the cross pieces 3, and upright members 5 forming legs, having inturned feet 6 that are adapted to be secured to the floor or other support. The cross pieces 3 support longitudinal slats 7 forming the bottom of the rack 1, said slats being spaced apart to permit drainage of the hose therebetween, and also providing rests for the hose between the slats to space the hose laid side by side from one another.

Mounted on each of the supporting members 4, 5, are channeled uprights 8, having their flanges 9, inturned as shown at 10 to form guideways for supporting bars 11 slidably mounted thereon, and having a horizontal portion 12 that supports cross beams 13 of the upper rack 2, 14 designating brace members connecting the members 11 with the outer portions of the horizontal members 12. The bottom of the rack 1 is formed of longitudinally spaced strips 15 arranged similarly to the strips 7 of the rack 1 to permit drainage of the hose laid thereon and also to space the adjacent lengths of hose from one another as hereinbefore stated with regard to strips 7.

As shown in Figure 1 the racks 1 and 2 are inclined, and in arranging the hose on the racks one end of the length of hose is mounted on rack 2 adjacent the left hand end thereof and then stretched along the rack and the unsupported portion is hung down and laid lengthwise on the rack 1 with its open end toward the lower portion of the rack. In this manner it will be understood that any water that may be in the hose will run out the open ends thereof and thus provide for more quickly drying the hose.

To prevent injury to the hose where folded down from rack 2 to rack 1, a curved lip is provided at the upper end of rack 2 and comprising curved supporting bars 16 to which are secured transverse strips 17.

For convenience in installing the hose on the rack 2, said rack is arranged to be elevated and lowered, and the construction by which this is accomplished will now be described. Secured to the bars 11 are arms 18 having threaded openings 19 therein that engage threaded shafts 20 to which are secured miter gears 21 that mesh with miter gears 22 engaging an operating shaft 23. It will be understood that the bars 11 will be simultaneously elevated or lowered by rotation of the shaft 23 in the proper direction. Arranged at one end of the rack is a power frame 24 carrying a train of gears 25 connecting the power shaft 26 with a driven shaft 27, and 28 indicates gearing connecting shaft 27 with shaft 23. Secured to power shaft 26 is a hand operated wheel 29 that is adapted to be actuated manually to drive the shaft 23 through the train of gearing 25 and the connecting gearing 28, but obviously the hand operated wheel may be arranged for actuation by motor of any approved type.

It will be understood that the advantages of this invention is that the hose may be dried within a heated enclosure and thus prevent freezing of the hose as is the experience in the hose of towers for draining hose generally employed, the obvious disadvantage of the tower means of draining hose being that in cold weather the hose is frozen, and furthermore this method of drying hose is a laborious operation, and inconvenient.

What is claimed is:—

1. A drying rack for fire hose comprising a table, whose supporting surface consists of spaced slats, a power shaft journaled on the table adjacent one side thereof, channeled bars rising from the table at the said side, a shelf having supporting bars at one side thereof slidably mounted in the channeled bars, arms extending from the supporting bars provided with screw threaded openings, screws in engagement with the threads in said openings, driving connections between said power shaft and said screws, the shelf having its supporting surface consisting of spaced slats, the space between the table and the main portion of the shelf being substantially unobstructed except at said side.

2. A drying rack for fire hose comprising a table, a power shaft journaled on the table adjacent one side thereof, channeled bars rising from the table at the said side, a shelf having supporting bars at one side thereof slidably mounted in the channeled bars, arms extending from the supporting bars provided with screw threaded openings, screws in engagement with the threads in said openings, driving connections between said power shaft and said screws, the space between the table and the main portion of the shelf being substantially unobstructed except at said side.

In testimony whereof I affix my signature.

FRANK FISHBOURNE.